United States Patent [19]

Chao et al.

[11] Patent Number: 5,576,394
[45] Date of Patent: Nov. 19, 1996

[54] FUNCTIONAL GROUP-CONTAINING BUTADIENE BASED IMPACT MODIFIER

[75] Inventors: Cheng-Lung Chao; Juh-Shyong Lee; Feng-Chih Chang, all of Hsinchu, Taiwan

[73] Assignee: Industrial Technology Research Institute, Hsinchu, Taiwan

[21] Appl. No.: 496,126

[22] Filed: Jun. 27, 1995

[51] Int. Cl.$^6$ ............... C08F 279/02; C08F 257/02; C08F 265/04

[52] U.S. Cl. ............... 525/310; 525/67; 525/296; 525/293; 525/301; 525/285; 525/292; 525/286; 525/303

[58] Field of Search ............... 525/310, 296, 525/293, 301, 285, 292, 286, 303

[56] References Cited

U.S. PATENT DOCUMENTS 4,443,585  4/1984  Goldman ............... 525/310
5,373,060  12/1994  Guentherberg ............... 525/301

*Primary Examiner*—Vasu S. Jagannathan
*Attorney, Agent, or Firm*—Darby & Darby, P.C.

[57] ABSTRACT

The present invention provides a functional group-containing alkyl acrylate-butadiene-aromatic vinyl compound copolymer which is obtained from the following layers by emulsion graftlinking polymerization: an inner layer comprising polybutadiene or an aromatic vinyl compound-butadiene copolymer; a middle layer comprising an aromatic vinyl compound—an alkyl acrylate copolymer; and an outer layer comprising an alkyl acrylate—a functional group-containing vinyl compound copolymer. The functional group-containing alkyl acrylate-butadiene-aromatic vinyl compound copolymer can be incorporated into a PC/PBT alloy as an impact modifier, thus the impact strength of the modified alloy composition at room temperature and low temperatures can be increased effectively.

19 Claims, No Drawings

FUNCTIONAL GROUP-CONTAINING BUTADIENE BASED IMPACT MODIFIER

BACKGROUND OF THE INVENTION

1. Field of the Invention

The present invention relates to a butadiene-based copolymer, more particularly relates to an alkyl acrylate-butadiene-aromatic vinyl compound copolymer with a specific functional group. Such a copolymer is suitable as an impact modifier for a PC/PBT alloy.

2. Description of the Prior Art

Polycarbonate/polybutylene terephthalate (PC/PBT) alloy has the properties of easy processability, good size stability, heat resistance, solvent resistance and is primarily applied in shaped articles for automobiles and outdoor sports equipment. However, PC/PBT alloy has the problems of being brittle, i.e., having low impact strength at room temperature and low temperatures.

The main measure to improve the physical properties of a PC/PBT alloy is to incorporate some modifiers such as impact modifiers, compatibilizers, glass fiber or fillers. An impact modifier is the most effective one.

There are various types of impact modifiers, including methyl methacrylate-butadiene-styrene (MBS) copolymer, acrylics, chlorinated polyethylene (CPE), ethylene vinyl acetate (EVA) copolymer and acrylonitrile-butadiene-styrene (ABS) copolymer. Among these, MBS impact modifiers most readily display an impact modifying effect at room temperature and low temperatures.

For example, Chacko et al. in U.S. Pat. No. 4,677,150 disclose an MBS modified PC/PBT alloy. The MBS is present in an amount of 20 wt. %, and the resulting alloy is determined to have an impact strength of 25.2 ft-lb/in at room temperature and 2.4 ft-lb/in at −20° C. It reveals that in order to make PC/PBT alloy impart acceptable impact strength at room temperature and low temperatures, a large amount of the conventional MBS, up to 20 wt. % of the total composition, must be added. The reason why the conventional MBS is effective only when the added amount is large is probably because the conventional MBS has no suitable interaction between the interface of the MBS and the PC/PBT alloy, therefore, the MBS is dispersed in the rubber in an uneven manner, that is, the compatibility of the conventional MBS with the alloy is poor. Consequently, the impact modifying effect of the conventional MBS is limited. Furthermore, such a large amount of MBS adversely affects some physical properties such as heat distortion temperature.

SUMMARY OF THE INVENTION

Therefore, it is an object of the present invention to solve the above-mentioned problems and to provide an improved MBS impact modifier. As compared with known prior art MBS, only a smaller amount of the improved MBS of this invention need be added to the PC/PBT alloy to improve the impact strength of the PC/PBT, while other physical properties remain unaffected.

To achieve the above object, the improved MBS of this invention or the functional group-containing alkyl acrylate-butadiene-aromatic vinyl compound copolymer of this invention is obtained from reacting the following layers by emulsion graftlinking polymerization:

(a) an inner layer comprising polybutadiene or an aromatic vinyl compound-butadiene copolymer;

(b) a middle layer comprising an aromatic vinyl compound and an alkyl acrylate copolymer; and (c) an outer layer comprising an alkyl acrylate and a functional group-containing vinyl compound copolymer.

According to one aspect of the invention, the improved MBS, which is a functional group-containing alkyl acrylate-butadiene-aromatic vinyl compound copolymer, contains a specific functional group which contributes to a suitable interaction between the MBS and the PC/PBT alloy. Therefore, the improved MBS can be evenly dispersed in the PC/PBT and the impact modifying effect can be increased to a maximum level.

DETAILED DESCRIPTION OF THE INVENTION

The improved MBS of the present invention is a functional group-containing alkyl acrylate-butadiene-aromatic vinyl compound copolymer. Since the most representative examples of the alkyl acrylate and the aromatic vinyl compound suitable for use are methacrylate and styrene, the functional group-containing alkyl acrylate-butadiene-aromatic vinyl compound copolymer of this invention is also denoted merely as the functional group-containing methacrylate-butadiene-styrene copolymer, which is sometimes abbreviated as the functional group-containing MBS or the MBS of this invention hereinafter.

The functional group-containing alkyl acrylate-butadiene-aromatic vinyl compound copolymer of this invention includes three layers. The inner layer includes polybutadiene or a copolymer of an aromatic vinyl compound and butadiene, which mainly absorbs the outer impact energy. The middle layer includes a copolymer of an aromatic vinyl monomer and an alkyl acrylate, which mainly connects the inner and outer layers. The outer layer includes a copolymer of an alkyl acrylate and a functional group-containing vinyl compound, which imparts compatibility of the functional group-containing MBS with the PC/PBT alloy. The functional group-containing vinyl monomer provides an additional compatibility. Due to the functional group, the functional group-containing vinyl monomer provides suitable interaction with PC/PBT alloy, thus the functional MBS can be uniformly dispersed in the alloy to increase its impact strength to a maximum level.

In the inner layer, polybutadiene latex or the copolymer latex of an aromatic vinyl compound and butadiene is preferably present in the amount of 20–80 wt. % of the total weight of the inner layer, and in the copolymer of an aromatic vinyl compound and butadiene, the aromatic vinyl compound is preferably in the amount of 0–50 wt. % of butadiene. The middle layer preferably contains 10–40 wt. % of the copolymer of an aromatic vinyl compound and an alkyl acrylate, and the alkyl acrylate is preferably in the amount of 20–80 wt. % of the aromatic vinyl compound. The outer layer preferably contains 10–40 wt. % of the copolymer of an alkyl acrylate and an functional group-containing vinyl compound, and the functional group-containing vinyl compound is preferably present in an amount of 1–20 wt. % of the alkyl acrylate.

The functional group-containing MBS of this invention is synthesized by multi-layered emulsion graftlinking polymerization, and the procedure can be divided into three stages. The first stage is forming the inner layer, by providing butadiene or the copolymer latex of the aromatic vinyl compound and butadiene. The second stage involves adding the middle layer including the aromatic vinyl compound, the alkyl acrylate, an emulsifying agent, initiator and deionized water to the inner layer formed to undergo an emulsion graftlinking polymerization. The third stage involves adding the outer layer including the alkyl acrylate, functional group-containing vinyl monomer, an emulsifying agent, initiator and deionized water to the above complex layer to undergo an emulsion graftlinking polymerization. After the reaction is complete, an antioxidant is added to prevent the polybutadiene or the aromatic vinyl compound-butadiene copolymer from being oxidized and yellowed. Finally, the obtained functional group-containing MBS latex can be isolated in a powder form by freezing, condensing with an acid, salting out or spray drying.

The aromatic vinyl monomers suitable for use in the present invention include styrene, α-methyl styrene and p-methyl styrene. Suitable alkyl acrylates include methyl methacrylate, isopropyl methacrylate, 2-butyl methacrylate and t-butyl methacrylate.

The present invention uses a vinyl monomer with a specific functional group. Examples of the functional group-containing vinyl monomer include an amide or amino group-containing vinyl compound such as acrylamide, N-methylol acrylamide or 2-dimethyl amino ethyl methacrylate; a carboxy group-containing vinyl compound such as acrylic acid, methyl acrylic acid, maleic anhydride or itaconic acid; a chloro methyl phenyl-containing vinyl compound such as chloro methyl styrene; an epoxy group-containing vinyl compound such as glycidyl methacrylate; a hydroxy group-containing vinyl compound such as 2-hydroxy ethyl methacrylate or 2-hydroxyl propyl methacrylate.

The emulsifying agents suitable for use in the present invention include sodium lauryl sulfate, sodium alkyl phenol polyethylene ether sulfate, sodium oleate and sodium stearate. The amount of the emulsifying agent is preferably 0.5–3% by weight of the total weight of the monomers used.

The initiators of this invention include two types, i.e., a pyrolysis type such as benzoyl peroxide, cyclohexanone peroxide, ammonium persulfate or potassium persulfate, and an oxidation-reduction type such as potassium persulfate-sodium bisulphite, cumene hydroperoxide-sodium formaldehyde sulfoxylate or t-butyl hydroperoxide-sodium formaldehyde sulfoxylate. The amount of the initiating agent is preferably 0.1–1% by weight of the total weight of the monomers used.

Examples of the antioxidants include 2,6-di-t-butyl-4-methyl phenol, 4,4'-butylidene bis-(3-methyl-6-t-butyl phenol), tetrakis[3(3,5-di-t-butyl-4-hydroxyphenol) propionyloxymethyl]methane, octadecyl 3-(3,5-di-t-butyl-4-hydroxyphenyl)-propionate, distearyl thiodipropionate, dimyristyl 3,3'-thiodipropionate, and ditridecyl 3,3'-thiodipropionate. The amount of the emulsifying agent is preferably 0.1–2% by weight of the total weight of the monomers used.

The following examples are intended to demonstrate this invention more fully without limiting its scope, since numerous modifications and variations will be apparent to those skilled in the art. All parts in the following examples are on a weight basis.

EXAMPLES

The following abbreviations are used in the examples and in Table 1:
PB=polybutadiene
SBR=styrene-butadiene copolymer
SLS=sodium lauryl sulfate
SM=styrene monomer
MMA=methyl methacrylate
SFS=sodium formaldehyde sulfoxylate
TBHP=t-butyl hydroperoxide
AAM=acrylamide
MAA=methyl acrylic acid
GMA=glycidyl methacrylate
AN=acrylnitrile
CMS=chloromethyl styrene
HEMA=2-hydroxy ethyl methacrylate

EXAMPLE 1

Preparation of the Functional Group-containing MBS

Part A containing 50 parts of polybutadiene latex, 0.5 parts of sodium lauryl sulfate and 100 parts of water was charged into a reaction tank. The mixture was heated to 50° C. under nitrogen with constant stirring. Then, part B containing 20 parts of styrene, 5 parts of methyl methacrylate monomer, 0.5 parts of sodium formaldehyde sulfoxylate, 0.25 parts of t-butyl hydroperoxide and 70 parts of water were added dropwisely into the reaction tank over a period of 2 hours. Subsequently, part C containing 24.5 parts of methyl methacrylate, 0.5 parts of acrylamide (a functional group-containing vinyl monomer), 0.5 parts of sodium formaldehyde sulfoxylate, 0.25 parts of t-butyl hydroperoxide and 80 parts of water were added dropwisely over a period of 2 hours. The mixture was stirred for an additional hour to obtain a functional group-containing MBS latex.

The functional group-containing MBS latex was mixed treated with an antioxidant and was then isolated by freezing, condensing with an acid, salting out or spray drying, filtered and dried to obtain functional group-containing MBS powders.

Modifying Effect of the Functional Group-containing MBS for PC/PBT Alloy 50 parts of PC, 50 parts of PBT, 10 parts of the functional group-containing MBS obtained from the above, 0.1 parts of antioxidant and trace of processing oil were blended with a twin screw machine and extruded to obtain a test sample for determination.

Physical properties, including Notched Izod impact strength, ductile and brittle transition temperature (DBTT), were determined by ASTM D-256. Elongation was determined by ASTM-638.

COMPARATIVE EXAMPLE 1

A commercial MBS under the tradename KCA 102 was added to a PC/PBT alloy in accordance with the method and conditions described in Example 1. Physical properties were also determined.

EXAMPLES 2–7

The same procedures as described in Example 1 were conducted except that the compositions were varied. The compositions of Examples 1–7 are presented in Table 1.

Table 2 shows the data of physical properties of the MBS modified PC/PBT alloy. It is seen that when 10 parts of MBS are added to 50 parts/50 parts of PC/PBT, the functional group-containing MBS modified compositions of this invention exhibit superior impact strength compared to the KCA 102 modified composition at room temperature and low temperatures.

TABLE 1

| | | Example No. | | | | | | |
|---|---|---|---|---|---|---|---|---|
| | | 1 | 2 | 3 | 4 | 5 | 6 | 7 |
| components (parts) | | | | | | | | |
| Part A: | PB latex | 50 | | 50 | 50 | 50 | 50 | 50 |
| | SBR latex | | 50 | | | | | |
| | SLS | 0.5 | 0.5 | 0.5 | 0.5 | 0.5 | 0.5 | 0.5 |
| | water | 100 | 100 | 100 | 100 | 100 | 100 | 100 |
| Part B: | SM | 20 | 20 | 20 | 20 | 20 | 20 | 20 |
| | MKA | 5 | 5 | 5 | 5 | 5 | 5 | 5 |
| | SFS | 0.5 | 0.5 | 0.5 | 0.5 | 0.5 | 0.5 | 0.5 |
| | TBHP | 0.25 | 0.25 | 0.3 | 0.3 | 0.3 | 0.3 | 0.3 |
| | water | 70 | 70 | 70 | 70 | 70 | 70 | 70 |
| Part C: | MMA | 24.5 | 24.5 | 24.5 | 24.5 | 24.5 | 24.5 | 24.5 |
| | AAM | 0.5 | 0.5 | | | | | |
| | MAA | | | 0.5 | | | | |
| | GMA | | | | 0.5 | | | |
| | AN | | | | | 0.5 | | |
| | CMS | | | | | | 0.5 | |
| | HEMA | | | | | | | 0.5 |
| | SFS | 0.5 | 0.5 | 0.5 | 0.5 | 0.5 | 0.5 | 0.5 |
| | TBHP | 0.25 | 0.25 | 0.3 | 0.3 | 0.3 | 0.3 | 0.3 |
| | water | 80 | 80 | 80 | 80 | 80 | 80 | 80 |

TABLE 2

| Example No. | Impact strength (ft-lb/in) | DBTT (°C.) | Elongation (%) |
|---|---|---|---|
| Ex. 1 | 26.9 | −27.5 | 10.9 |
| Ex. 2 | 24.9 | −10 | 56.1 |
| Ex. 3 | 18.1 | −20 | 16.7 |
| Ex. 4 | 20.3 | −7.5 | 23.3 |
| Ex. 5 | 20.9 | −10 | 63.5 |
| Ex. 6 | 19.3 | −20 | 16.2 |
| Ex. 7 | 20.0 | −20 | 17.2 |
| Comparative Example 1 | 14.3 | −10 | — |

What is claimed is:

1. A functional group-containing alkyl methacrylate-butadiene-aromatic vinyl compound copolymer, which is obtained from the following layers by emulsion graftlinking polymerization:

(a) an inner layer comprising polybutadiene;

(b) a middle layer comprising an aromatic vinyl compound and an alkyl methacrylate copolymer; and (c) an outer layer comprising an alkyl methacrylate and a functional group-containing vinyl compound copolymer.

2. The functional group-containing alkyl methacrylate-butadiene-aromatic vinyl compound copolymer as claimed in claim 1, wherein the inner layer contains 20–80 wt. % of polybutadiene.

3. The functional group-containing alkyl methacrylate-butadiene-aromatic vinyl compound copolymer as claimed in claim 1, wherein the middle layer contains 10–40 wt. % of the aromatic vinyl compound-alkyl methacrylate copolymer.

4. The functional group-containing alkyl methacrylate-butadiene-aromatic vinyl compound copolymer as claimed in claim 3, wherein the alkyl methacrylate is present in an amount of 20–80 wt. % of the aromatic vinyl compound.

5. The functional group-containing alkyl methacrylate-butadiene-aromatic vinyl compound copolymer as claimed in claim 1, wherein the outer layer contains 10–40 wt. % of the alkyl methacrylate-functional group-containing vinyl compound copolymer.

6. The functional group-containing alkyl methacrylate-butadiene-aromatic vinyl compound copolymer as claimed in claim 5, wherein the functional group-containing vinyl compound is present in an amount of 1–20 wt. % of the alkyl methacrylate.

7. The functional group-containing alkyl acrylate-butadiene-aromatic vinyl compound copolymer as claimed in claim 1, wherein the aromatic vinyl compound is selected from the group consisting of styrene, α-methyl styrene and p-methyl styrene.

8. The functional group-containing alkyl methacrylate-butadiene-aromatic vinyl compound copolymer as claimed in claim 1, wherein the alkyl methacrylate is selected from the group consisting of methyl methacrylate, isopropyl methacrylate, 2-butyl methacrylate and t-butyl methacrylate.

9. The functional group-containing alkyl acrylate-butadiene-aromatic vinyl compound copolymer as claimed in claim 1, wherein the functional group-containing vinyl compound is an amide or amino group-containing vinyl compound.

10. A functional group-containing alkyl acrylate-butadiene-aromatic vinyl compound copolymer as claimed in claim 9, wherein the functional group-containing vinyl compound is selected from the group consisting of acrylamide, N-methylol acrylamide and 2-dimethyl amino ethyl methacrylate.

11. The functional group-containing alkyl acrylate-butadiene-aromatic vinyl compound copolymer as claimed in claim 1, wherein the functional group-containing vinyl compound is a carboxy group-containing vinyl compound.

12. The functional group-containing alkyl acrylate-butadiene-aromatic vinyl compound copolymer as claimed in claim 11, wherein the functional group-containing vinyl compound is selected from the group consisting of acrylic acid, methyl acrylic acid, maleic anhydride and itaconic acid.

13. The functional group-containing alkyl acrylate-butadiene-aromatic vinyl compound copolymer as claimed in claim 1, wherein the functional group-containing vinyl compound is a chloro methyl phenyl group-containing vinyl compound.

14. The functional group-containing alkyl acrylate-butadiene-aromatic vinyl compound copolymer as claimed in claim 13, wherein the functional group-containing vinyl compound is chloro methyl styrene.

15. The functional group-containing alkyl acrylate-butadiene-aromatic vinyl compound copolymer as claimed in claim 1, wherein the functional group-containing vinyl compound is an epoxy group-containing vinyl compound.

16. The functional group-containing alkyl acrylate-butadiene-aromatic vinyl compound copolymer as claimed in claim 15, wherein the functional group-containing vinyl compound is glycidyl methacrylate.

17. The functional group-containing alkyl acrylate-butadiene-aromatic vinyl compound copolymer as claimed in claim 1, wherein the functional group-containing vinyl compound is a hydroxy group-containing vinyl compound.

18. The functional group-containing alkyl acrylate-butadiene-aromatic vinyl compound copolymer as claimed in claim 17, wherein the functional group-containing vinyl compound is selected from the group consisting of 2-hydroxy ethyl methacrylate and 2-hydroxypropyl methacrylate.

19. A functional group containing alkyl methacrylate-butadiene-aromatic vinyl compound copolymer, which is used for impact modifying a polycarbonate/polybutylene (PC/PBT) alloy and is obtained from the following layers by emulsion graftlinking polymerization:

(a) an inner layer comprising polybutadiene;

(b) a middle layer comprising an aromatic vinyl compound and an alkyl methacrylate copolymer; and (c) an outer layer comprising an alkyl methacrylate and a functional group-containing vinyl compound copolymer.

* * * * *